Figure 1:
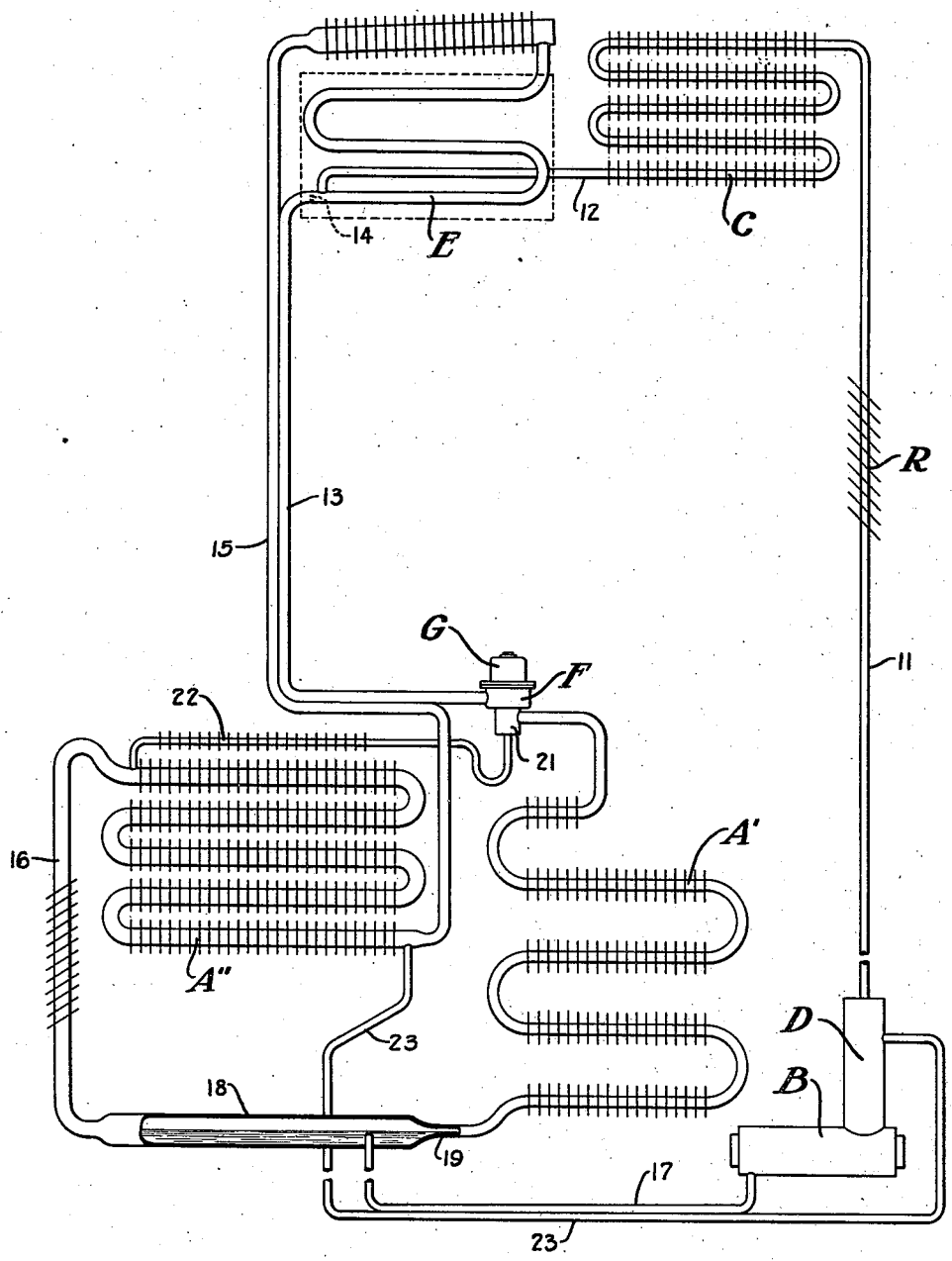

March 3, 1942.     G. A. BRACE     2,274,659
REFRIGERATION
Filed July 20, 1938     2 Sheets-Sheet 1

INVENTOR
George A. Brace
BY
Harry S. Demarest
ATTORNEY

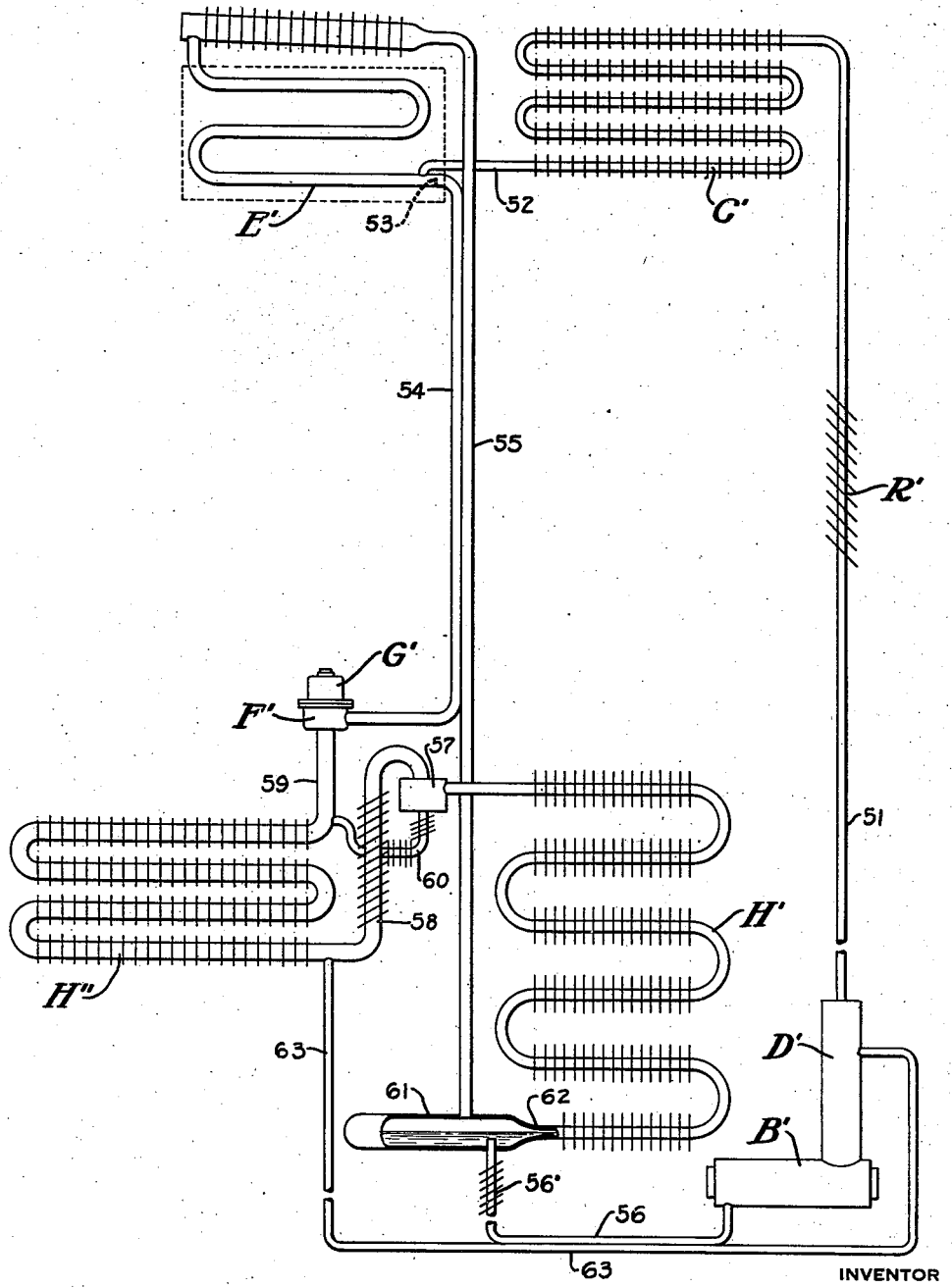

Patented Mar. 3, 1942

2,274,659

UNITED STATES PATENT OFFICE 2,274,659

REFRIGERATION

George A. Brace, Winnetka, Ill., assignor to The Hoover Company, North Canton, Ohio, a corporation of Ohio Application July 20, 1938, Serial No. 220,196
In Great Britain August 20, 1937

32 Claims. (Cl. 62—119.5)

This invention relates to absorption refrigerating systems and more particularly to absorption refrigerating systems in which a propelled pressure equalizing medium is utilized to circulate fluids in the system.

Heretofore it has been customary to circulate the absorption solution in absorption refrigerating systems by means of a vapor lift or gas lift pump. These devices frequently cause serious difficulties due to clogging, and the small conduits required therefor increase the cost and complexity of the apparatus. It has also been proposed to pump liquid refrigerant from the condenser up into the top of the evaporator whereby it might flow therethrough by gravity; other systems position the condenser above the evaporator to permit the liquid to flow through the evaporator by gravity. I have devised a system in which these extraordinary pumping devices are entirely eliminated and the condenser and evaporator levels are substantially independent one of another within the limits required for domestic refrigerating systems.

According to the present invention, a small fan operating at a relatively low speed is arranged to circulate positively all fluids in the system. The arrangement is such that the fluids are circulated entirely through the ordinary parts of the system, no auxiliary pumping devices being required. The absorber may be formed in a plurality of sections which operate at different temperature levels and provide a relatively great heat rejecting area. The arrangement also provides for efficient pre-cooling of the absorption solution and for interstage gas and liquid cooling between the absorber stages.

I have devised a refrigerating system wherein the absorber includes a plurality of sections through one of which the liquid flows upwardly under the impetus of the pressure equalizing medium and through the other of which liquid flows downwardly in counterflow relationship with the pressure equalizing medium. The arrangement is such that efficient absorption and efficient rejection of the heat of absorption are assured. The absorber sections may be referred to as elevating and counterflow sections for purposes of identification. The elevating section may operate at a high temperature in order to reject the major portion of the heat of absorption from a small area. In this event the counterflow section operates as a low temperature stripping absorber. The elevating section may operate at very low temperatures and serve to pre-cool the solution and to strip the inert gas. In this event the counterflow section serves as a main absorber to carry the absorption process nearly to completion.

Various other and more specific objects and advantages of the invention will become apparent as the description proceeds when taken in connection with the accompanying drawings in which:

Figure 1 is a diagrammatic illustration of one type of refrigerating system embodying my invention; and Figure 2 is a diagrammatic illustration of another form of refrigerating apparatus embodying my invention.

It is to be understood that the invention is illustrated diagrammatically in Figures 1 and 2. No attempt has been made to illustrate in detail the specific structures and relative elevations of the various elements. The diagrammatic illustration has been selected to depict clearly the functional relationships between the various elements of the refrigerating systems disclosed.

Referring to the drawings in detail and first to Figure 1 thereof, it will be seen that I have illustrated my invention as being applied to a continuous three fluid absorption refrigerating apparatus comprising a boiler B, an analyzer D, a rectifier R, a condenser C, an evaporator E, a circulating fan F driven by an electrical motor G, and an absorber comprising a plurality of sections A' and A" all suitably connected by various conduits to form a complete refrigerating system including a plurality of gas and liquid circuits.

It will be understood that the refrigerating system just described is suitably charged with a refrigerant such as ammonia, an absorbent such as water, and a pressure equalizing medium, preferably a dense inert gas such as nitrogen.

The boiler B is heated in any suitable manner as by a gas burner or an electrical cartridge heater. The source of heat for the boiler B and the current for the circulating motor G are controlled in any suitable or approved manner, a preferred control mechanism being illustrated in the co-pending application of Curtis C. Coons, Serial No. 148,424, filed June 17, 1937, now Patent No. 2,228,343, issued January 14, 1941.

During normal operation, the boiler B contains a solution of refrigerant in an absorbent which liberates refrigerant vapor when heat is applied thereto. The refrigerant vapor liberated in the boiler B passes upwardly through the analyzer D in counterflow relationship to strong solution flowing downwardly therethrough whereby absorption solution vapor formed in the boiler is condensed and the heat of condensation liberates further refrigerant vapor in the analyzer. The refrigerant vapor is conveyed from the analyzer into the upper portion of the air-cooled condenser C by means of a conduit 11 which includes a rectifier R. The rectifier R condenses any vapors of absorption solution which may pass through the analyzer D.

The refrigerant vapor is liquefied in the condenser C and is discharged therefrom through a conduit 12 into the bottom portion of an evaporator E which may be of any desired construction or form, a preferred construction being illustrated in the application of Curtis C. Coons and William H. Kitto, Serial No. 220,189, said application being replaced by continuation-in-part application Serial No. 386,395, filed April 2, 1941, filed concurrently herewith. The condenser C extends substantially to the level of the lowest portion of the evaporator E.

The motor-driven fan F propels a high velocity stream of pressure equalizing medium, preferably a dense inert gas such as nitrogen, through the conduit 13 into the bottom of the evaporator E adjacent the point at which liquid refrigerant is supplied thereto. A small dam 14 prevents liquid refrigerant from flowing downwardly through the conduit 13. The pressure equalizing medium circulating upwardly through the evaporator drags or sweeps the liquid refrigerant upwardly through the evaporator as it is vaporizing to produce refrigeration. The rich mixture formed in the evaporator is conveyed therefrom to the bottom portion of the absorber A" through a conduit 15 which is in heat exchange relationship with the conduit 13 previously described.

The absorber section A" may be of any desired construction; as illustrated, it is constructed from a continuous conduit which is reversely bent to provide a plurality of serially connected parallel conduit sections suitably finned to reject the heat of absorption to the surrounding air. The rich gas travels through the absorber section A" in counterflow to absorption solution supplied from a source to be described hereinafter whereby the refrigerant vapor is removed from the inert gas by absorption and the heat of absorption is dissipated through the cooling fins.

The moderately lean inert gas is conveyed from the upper portion of the absorber section A" through a finned air-cooled conduit 16 to the bottom portion of the absorber section A'. The absorber section A' may also be constructed of a continuous reversely bent conduit shaped to form a plurality of parallel serially connected conduits which are provided with suitable heat radiating fins whereby the absorber is air-cooled. The absorber section A' is constructed of tubing of smaller diameter than that utilized for the absorber section A", whereby the velocity of flow of the inert gas therethrough is relatively great.

Weak solution formed in the boiler B is conveyed therefrom through a conduit 17 into a solution reservoir 18 which is formed as an elongated enlarged conduit portion of the absorber A' and communicates therewith through a long tapered portion 19. The high velocity stream of gas travelling through the absorber section A' drags or sweeps the absorption solution upwardly therethrough under extremely turbulent conditions similar to those occurring in evaporator E, whereby to promote intimate gas and liquid contact and intimate heat exchange relationship between the liquid and the walls of the absorber to promote heat rejection.

The absorber section A' is supplied with lean solution and lean gas wherefore it acts as a stripping absorber and as a pre-cooler for the solution because of its very high ratio of heat rejecting area to quantity of heat to be dissipated. The weak solution elevated through the absorber section A' is conducted into a gas separation chamber 21 mounted on the suction inlet of the fan F. The solution supplied to the chamber 21 discharges therefrom through a finned air-cooled conduit 22 into the gas outlet portion of the absorber section A" through which the liquid flows by gravity counter to the inert gas as explained previously. The strong solution formed in the absorber section A" discharges from the bottom thereof through a conduit 23, which is in heat exchange relationship with the conduit 17, into the upper portion of the analyzer D. The absorber section A" carries the main absorption load and it operates at a higher temperature than the absorber section A'.

In Figure 2, I have illustrated diagrammatically a refrigerating system comprising a boiler B', an analyzer D', a rectifier R', a condenser C', an evaporator E', a circulating fan F" driven by an electrical motor G', an elevating absorber section H', and an absorber section H" suitably connected by various conduits to form a plurality of gas and liquid circuits constituting a complete refrigerating system.

It is understood that the refrigerating system shown in Figure 2 will be suitably charged and controlled in a manner similar to that explained in connection with the system illustrated in Figure 1.

Refrigerant vapor generated in the boiler B' passes upwardly through the analyzer D' in counterflow relationship with strong absorption solution whereby refrigerant vapor is generated from the solution by the condensation of absorption solution vapor carried upwardly from the boiler. The refrigerant vapor is conveyed from the analyzer D' to the condenser C' by means of a conduit 51 which includes the rectifier R'. The rectifier R' causes condensation of any absorption solution vapor which may pass through the analyzer D'. The refrigerant vapor is condensed or liquefied in the condenser C' by heat exchange with ambient air. The liquid refrigerant is conveyed from the lower part of the condenser C' to the bottom of the evaporator E' through a conduit 52. A small dam 53 prevents liquid refrigerant from flowing out of the evaporator.

In the bottom of the evaporator E', the liquid refrigerant meets a high velocity stream of pressure equalizing medium supplied from the fan F" through a conduit 54. The pressure equalizing medium drags or sweeps the liquid refrigerant upwardly through the evaporator as the liquid evaporates, in the manner explained in connection with Figure 1. The evaporator may be of any desired construction, also as explained in connection with Figure 1. The pressure equalizing medium refrigerant vapor mixture formed in the evaporator E' is conveyed from the upper end thereof to the bottom of the absorber section H' by a conduit 55 which is in heat exchange relationship with the conduit 54 previously described.

The bottom of the absorber section H' is provided with an elongated enlarged reservoir portion 61 and communicates therewith through an elongated tapered portion 62. Weak solution is conveyed to the reservoir from the boiler by a conduit 56 which includes a finned air-cooled solution pre-cooling portion 56'.

The absorption solution is blown or swept upwardly through the absorber section H' by the high velocity stream of pressure equalizing medium while simultaneously absorbing refrigerant vapor therefrom. The pressure equalizing medium refrigerant vapor mixture and the absorption solution is discharged from the upper end of the absorber section H' into a separation chamber 57. The pressure equalizing medium refrigerant vapor mixture is conveyed from the separation chamber 57 to the bottom of the absorber section H" through a conduit 58 which is provided with air-cooling fins. The pressure equalizing medium refrigerant vapor mixture flows upwardly through the absorber section H", which has a larger internal cross-sectional area than the absorber section H' and may consist of a plurality of reversely bent finned air-cooled conduits, in counterflow relationship with absorption medium flowing downwardly therethrough whereby the refrigerant vapor is absorbed in the liquid and substantially pure inert gas is returned to the suction inlet of the fan F' through the conduit 59. The absorption solution elevated into the separation chamber 57 is conveyed therefrom to the upper portion of the absorber section H" through a finned air-cooled conduit 60 which includes a U-shaped gas sealing portion.

The strong solution formed in the absorber section H" is discharged into the upper portion of the analyzer D' through a conduit 63, which is in heat exchange relationship with the conduit 56 previously described.

The elevating absorber section H' functions as a high temperature absorber. A substantial part of the absorption process occurs in the section H' due to the fact that lean absorption solution is intimately mixed with rich gas therein. The absorber section H' preferably is designed to reject a large portion of the heat of absorption whereby the absorption process may be carried to completion at relatively low temperatures in the absorber section H" in which the fluids circulate in counterflow relation.

It is apparent that the refrigeration system just described is quite similar to that described in connection with Figure 1, one of the principal differences being that the rich gas is utilized to elevate the absorption solution through the elevating absorber section H'.

The circulating fans F and F' may be of a very small size if a dense inert gas such as nitrogen is utilized as the pressure equalizing medium. Even with a fan of small size, it is possible to circulate positively all fluids in the system with this single element.

The reservoirs 18 and 61 are designed to contain large area shallow pools of absorption solution whereby minor fluctuations in the level of the solution in the boiler-analyzer systems are not reflected in the reservoirs thereby preventing the solution level from dropping below the inlets to the elevating absorber sections and stopping the circulation of the absorption solution and the absorption of refrigerant vapor. The tapered sections 19 and 62 insure that there shall be absorption solution in areas of relatively high gas velocity at all times whereby the solution will be circulated regardless of minor system disturbances. Moreover, due to the construction, arrangement, and capacity of these reservoirs, transient abnormal conditions in the system affecting the liquid level in the boiler have little or no effect on the liquid level in the reservoirs. Consequently, the rate of circulation of the absorption solution is substantially constant, and affected only by the fan speed and the pressure within the system.

The propelling power of the inert gas stream is a function of its density, pressure, and velocity of flow through the evaporator or elevating absorbers. In general an increase in the value of any one or more of the above enumerated factors results in an increase in the lifting power of the inert gas. Other things being equal, the velocity of the inert gas will be a function of the effective cross-sectional area of its path of flow, and an increase in the effective cross-sectional area of that path results in a decrease in gas velocity.

It is for these reasons that the cross-sectional area of the elevating absorber sections is materially less than the cross-sectional area of the counterflow absorber sections. For example, it has been found that a propelled stream of nitrogen will circulate liquid upwardly through an evaporator or an absorber conduit of a size suitable for domestic use having an inside diameter of approximately one-half inch, a pressure differential of between two and four inches of water between the gas inlet and outlet connections to the evaporator or absorber, and with a total system pressure ranging between 270 and 400 pounds per square inch. Under the conditions just enumerated it has been found that liquid will flow counter to the gas stream in a conduit, such as the counterflow absorbers disclosed herein, having an inside diameter of approximately one inch or more. These dimensions are illustrative only and are not limiting since other conditions permit conduit sizes different from those mentioned.

A continuous stream of the inert gas traverses the evaporator and absorber and conveys the liquid refrigerant and absorption solution through horizontal or slightly sloping conduits by sweeping or dragging the liquid along the bottom of the conduit, but in substantially vertical or elevating conduits, such as the return bends connecting the substantially horizontal evaporator and absorber conduits, the gas is blowing through a body of the liquid. Therefore, in the horizontal or slightly inclined conduits the gas stream sweeps over a stream of liquid which it propels and agitates by exerting a frictional drag thereon; whereas, in the substantially vertical conduits the gas is blowing through a relatively large body of the liquid in the lower portions of such conduits with which it is in intimate contact. The friction and impact of the gas blowing through the bodies of liquid in the riser or elevating conduits drags or sweeps a portion of that liquid upwardly into the next conduit section. Thus, absorption takes place in the elevating absorbers through the action of a high velocity gas stream propelling a liquid through a horizontal or inclined conduit and through the action of a gas stream forcing itself through a body of liquid in an elevating conduit while conveying part of the body of liquid to a higher elevation. The gas and liquid contact in the evaporator is also of two types; that is, the gas sweeps or drags the liquid through horizontal or slightly inclined conduits and blows or blasts through columns of liquid in the elevating conduits of the evaporator.

The gas has been described as being propelled at a high velocity, but this is to be interpreted in relation to the other conditions prevailing within the system. For example, in the particular embodiment disclosed the gas velocity need be only of the order of a few feet per second in order to circulate the fluids and to promote effective absorption and evaporation if a dense inert gas like nitrogen is utilized.

The flow of inert gas through the evaporator and absorber is substantially continuous and steady though there is a pressure gradient from the inlet to the outlet portions thereof due to the throttling action of the liquid, particularly in rising conduits, on the gas stream. This insures substantially continuous uniform propulsion of liquid through the evaporator and absorber and continuous absorption of refrigerant whenever the refrigerating mechanism is operating.

The liquid circulating system embodied in the refrigerating systems herein disclosed possesses a very important characteristic in that the volume of inert gas circulating through the evaporator or elevating absorber is relatively very great as compared with the volume of liquid refrigerant or absorption solution supplied to the evaporator or absorber per unit of time. In the case of the evaporator, it has been found advantageous to circulate several hundred times as much gas as liquid per unit of time in order to produce temperature conditions suitable for the production of ice and for the preservation of foodstuffs. In the case of the absorber, the ratio of gas volume to liquid volume is also very high though it is lower than the ratio of inert gas volume to liquid refrigerant volume per unit of time because the volume of solution circulating may be several times the volume of the circulating liquid refrigerant. The high ratio of gas to liquid volumes in the absorber is advantageous because the quantity of refrigerant vapor per unit volume of gas is not sufficient to raise the concentration of a unit volume of absorption solution appreciably, and it is highly advantageous to operate the boiler with relatively highly concentrated absorption solution.

From the foregoing detailed description of two embodiments of the invention, which have been given in order to illustrate ways in which the principles of my invention may be put into practice, it will be appreciated that I have provided a very simple absorption refrigeration system having many advantages over systems heretofore known. Not only is the necessity for both vapor and gas lift pumps and their attendant disadvantages avoided, but all fluids in the system including both liquid refrigerant and absorption solution, are positively circulated by means of a minimum number of simple parts.

Among the particularly important features of my system are the following: The combined absorber and solution circulating element of Figure 2 serves as a high temperature absorber, thus enabling absorption to take place with the greatest efficiency and with a minimum heat dissipating area. The remaining gaseous mixture is first cooled out of contact with absorption solution, and then stripped of refrigerant while flowing in counterflow to the partially enriched solution. According to Figure 1, the absorption liquid elevating device may be made with only sufficient length and area to permit elevation of the solution to the main absorber, stripping of the refrigerant remaining in the inert gas discharged from the main absorber, and cooling of the solution to as low a temperature as possible.

Furthermore, it will be clear that in both forms of the invention the inert gas is utilized to elevate the absorption solution while at the same time retaining the advantages of counterflow relationship between the liquid and the gas in some part of the absorber assembly. In both embodiments it will be noted that I have provided interstage cooling of both the solution and the gaseous mixture. Furthermore, this cooling takes place with the gases and liquid out of contact with one another.

Attention is also called to the simple evaporator construction which I prefer to use in the construction herein described, although it will be understood that I contemplate using evaporators of other types also. The evaporator shown is of the two temperature type in which the upper, or box-cooling section, operates at temperatures above the freezing point of water, thus minimizing the deposition of frost and the dehumidification of the box air, and a lower or sharp freezing section operating at a temperature below freezing to provide ice cubes and frozen desserts.

Another feature is the fact that no drains or sumps are required in addition to the conduits required for the various normal fluid circuits of the system.

While I have illustrated and described only two embodiments of my invention, they are to be taken as illustrative only and not in a limiting sense. My invention is capable of embodiment in various other constructions without departing from the spirit thereof or the scope of the appended claims.

I claim:

1. Refrigerating apparatus including an absorber conduit having a body of absorption solution therein, an evaporating conduit having a body of liquid refrigerant therein, and means for propelling a dense inert gas through said conduits to exert a frictional drag on said liquid which causes the same to move through said conduits at a velocity less than the velocity of the inert gas.

2. Refrigerating apparatus comprising a pressure equalizing medium circuit including an evaporator and an absorber, a solution circuit including a boiler and said absorber, a power-driven fan for circulating pressure equalizing medium through said pressure equalizing medium circuit, means for supplying refrigerant to said evaporator below the top thereof, means for supplying an absorbent to said absorber below the top thereof, said pressure equalizing medium circuit being so constructed and arranged that the pressure equalizing medium circulates through said evaporator and said absorber with a velocity sufficient to elevate refrigerant and absorbent through said evaporator and said absorber, respectively by the sweeping or dragging action of the inert gas on the refrigerant and absorbent.

3. Absorption refrigerating apparatus comprising a pressure equalizing medium circuit including an evaporator and an absorber, a solution circuit including said absorber and a boiler, means for supplying refrigerant vapor generated by said boiler to the bottom portion of said evaporator in liquid form, means for circulating a pressure equalizing medium through said pressure equalizing medium circuit under conditions such that said pressure equalizing medium functions simultaneously to elevate liquid refrigerant through said evaporator as it is vaporizing and to elevate absorption solution in said absorber as it is absorbing refrigerant vapor by the frictional drag of the pressure equalizing medium flowing in contact with the refrigerant and absorbent in said evaporator and absorber, respectively.

4. Absorption refrigerating apparatus including a pressure equalizing medium circuit having an evaporator and an absorber therein, means for supplying liquid refrigerant to said evaporator, power-driven means for propelling a pressure equalizing medium through said circuit, said absorber comprising a pair of absorber sections, means for supplying absorption solution to the bottom of one of said sections, means for conveying absorption solution from the top of one section to the top portion of the other absorber section, means for draining absorption solution from the bottom portion of said other absorber section, the arrangement being such that said pressure equalizing medium elevates absorption solution through said one absorber section and flows in counterflow relation to absorption solution in the other of said sections.

5. Absorption refrigerating apparatus including a pressure equalizing medium circuit having an evaporator and a pair of absorber sections therein, power-driven means for circulating a pressure equalizing medium through said circuit, means for supplying weak absorption solution to the bottom portion of one of said absorber sections, means for conducting rich pressure equalizing medium discharged from said evaporator into the bottom portion of the other of said absorber sections, means for conveying pressure equalizing medium from the top portion of said other absorber section to the bottom portion of said one absorber section, and means for conveying absorption solution from the top portion of said one absorber section to the top portion of said other absorber section.

6. Absorption refrigerating apparatus comprising a pressure equalizing medium circuit including an evaporator and an absorber, means for circulating a pressure equalizing medium through said circuit, said absorber comprising a pair of serially connected absorber sections, means for conveying weak solution to the bottom portion of one of said absorber sections, means for conveying rich pressure equalizing medium from said evaporator to the bottom portion of said one absorber section, means for conveying solution from the top portion of said one absorber section to the top portion of said other absorber section, and means for conveying pressure equalizing medium from the top portion of said one absorber section to the bottom portion of said other absorber section.

7. Absorption refrigerating apparatus including an absorber, an elongated shallow reservoir connected to the bottom of said absorber, means for supplying absorbing solution to said reservoir, means for propelling a pressure equalizing medium serially through said absorber from the bottom to the top thereof with a velocity sufficient to sweep or drag the absorbing solution upwardly therethrough, and means for draining solution from the top portion of said absorber.

8. That method of producing refrigeration which includes the steps of supplying liquid refrigerant to an evaporating zone, supplying absorption solution to an absorption zone, propelling a pressure equalizing medium serially through said evaporating and absorption zones, and elevating liquid refrigerant and absorption solution by the frictional drag exerted thereon by said pressure equalizing medium in said evaporating and absorbing zones, respectively.

9. That improvement in the art of refrigeration which includes the steps of evaporating a liquid into a propelled stream of pressure equalizing medium to produce refrigeration, flowing the resulting mixture of pressure equalizing medium and refrigerant vapor to flow through an absorbing zone in counterflow relationship to absorption solution, and employing the resulting weak pressure equalizing medium to elevate weak solution through an absorbing zone while simultaneously cooling the solution.

10. That improvement in the art of refrigeration which includes the steps of supplying liquid refrigerant to the lower portion of an evaporating zone having a plurality of portions of different slope, supplying absorption solution to the lower portion of an absorbing zone having a plurality of portions of different slopes, propelling the liquid through portions of such zones having a slight slope by the frictional drag exerted on streams of the liquid by a gas stream flowing thereover, propelling the liquid through portions of such zones having a steep slope by propelling a gas stream through finely divided bodies of the liquid and elevating a portion thereof up such steep slope by the frictional drag exerted thereon by the gas stream flowing therethrough, and simultaneously evaporating the refrigerant liquid into the gas in the evaporating zone and absorbing the vapor so produced in the liquid in the absorbing zone.

11. Absorption refrigerating apparatus comprising a solution circuit including a boiler, a first absorber section, a second absorber section, power-driven means for circulating a pressure equalizing medium and vapor to be absorbed serially through said absorber sections, means for conveying weak solution from said boiler to the bottom portion of said first absorber section, means for conveying absorption solution from the top portion of said first absorber section to the top portion of said second absorber section, means for conveying solution from the bottom portion of said second absorber section to said boiler, the arrangement being such that absorption solution flows upwardly through said first absorber section in unidirectional relationship with the pressure equalizing medium and flows downwardly through said second absorber section in counterflow relationship with said pressure equalizing medium.

12. Refrigerating apparatus including a plurality of vessels interconnected to form a plurality of overlapping fluid circuits, power driven means for circulating a fluid through one of said circuits and for circulating fluids through the other circuits by the frictional drag exerted thereon by said first-mentioned fluid in the overlapping portions of said circuits.

13. That method of producing refrigeration which includes the step of supplying liquid refrigerant to an evaporating zone, supplying an absorbing medium to an absorbing zone, introducing a high velocity stream of pressure equalizing medium into said absorbing and evaporating zones above the absorbing medium and liquid refrigerant, respectively, and circulating the liquid refrigerant and the absorption solution through the evaporating and absorbing zones, respectively, by the impetus which is imparted thereto by the high velocity stream of pressure equalizing medium flowing thereby.

14. Refrigerating apparatus comprising a pressure equalizing medium circuit including an evaporator, a first absorber, and a second absorber, means for supplying liquid refrigerant to said evaporator, means for supplying absorbing solution to one of said absorbers, means for conducting absorbing solution from the pressure equalizing medium outlet portion of one of said absorbers to the pressure equalizing medium outlet portion of the other of said absorbers, means for conveying pressure equalizing medium from one of said absorbers to the other of said absorbers, and means for cooling said pressure equalizing medium as it passes between said absorbers.

15. Refrigerating apparatus comprising a solution circuit including a boiler, a first absorber, a reservoir, a solution pre-cooler and a second absorber, an evaporator, means for supplying refrigerant vapor generated in said boiler to said evaporator in liquid phase, means for propelling an inert gas through a circuit including said evaporator, said reservoir, and said absorbers, the arrangement being such that solution is supplied to said reservoir from said pre-cooler and is elevated through one of said absorbers by rich gas discharged from said evaporator.

16. Refrigerating apparatus comprising a pressure equalizing medium circuit including a pair of absorbers having different cross-sectional areas, a solution circuit including said absorbers, means for circulating a pressure equalizing medium upwardly through each of said absorbers, the arrangement being such that absorption solution is elevated through the absorber of smallest cross-sectional area by the frictional drag exerted thereon by the gas stream flowing through said absorber, and means for draining the absorption solution elevated through the absorber of small cross-sectional area by the drag of the pressure equalizing medium flowing therethrough into the upper portion of the absorber of large cross-sectional area.

17. That improvement in the art of refrigeration which includes the step of propelling a pressure equalizing medium through an evaporating zone in contact with liquid refrigerant, circulating the liquid refrigerant through the evaporating zone by the frictional drag of the pressure equalizing medium as the liquid is evaporating thereinto, circulating the mixture of pressure equalizing medium and refrigerant vapor so produced through an absorbing zone in contact with absorption solution, and elevating absorption solution through the absorbing zone by the frictional drag of the pressure equalizing medium refrigerant vapor mixture flowing through such absorbing zone.

18. Absorption refrigerating apparatus including an evaporator, an absorber, a boiler, means for supplying refrigerant vapor generated in said boiler to the bottom portion of said evaporator in liquid phase, means for conveying weak solution from said boiler to the bottom portion of said absorber, means for conveying strong solution from the upper portion of said absorber to said boiler, and power driven means for circulating said liquid refrigerant and absorption solution upwardly through said absorber and said evaporator respectively by introducing a high velocity dense inert gas stream into the bottom portion of said evaporator and absorber above the liquid refrigerant and absorption solution supplied thereto, respectively to drag said liquid refrigerant and absorption solution respectively through said absorber and evaporator at a lower velocity than said gas stream.

19. Absorption refrigerating apparatus including an evaporator, an absorber, a boiler, an analyzer, power-driven means for circulating a pressure equalizing medium upwardly through said evaporator and said absorber, means for supplying refrigerant vapor generated in said boiler to the bottom of said evaporator in liquid phase, means for conveying weak solution from said boiler to the bottom of said absorber, means for conveying strong solution from the upper portion of said absorber to said analyzer, the arrangement being such that said pressure equalizing medium propels absorption solution and liquid refrigerant upwardly in said absorber and in said evaporator, respectively.

20. Absorption refrigerating apparatus comprising an inert gas circuit including an evaporating vessel, a low temperature absorbing vessel, and a high temperature absorbing vessel, means for supplying liquid refrigerant to said evaporating vessel, means for supplying absorbing solution to said absorbing vessels, and means for circulating the inert gas through said evaporating vessel with a velocity sufficient to impart a frictional propelling force to the refrigerant to circulate the refrigerant through said evaporating vessel.

21. Absorption refrigerating apparatus comprising an inert gas circuit including an evaporating vessel, a low temperature absorbing vessel, and a high temperature absorbing vessel, means for supplying liquid refrigerant to said evaporating vessel, means for supplying absorbing solution to said absorbing vessels, and means for circulating the inert gas through said evaporating vessel with a velocity sufficient to propel the refrigerant therethrough by the frictional drag of the inert gas flowing thereby, at least one of said vessels being constructed of continuous conduit.

22. Absorption refrigerting apparatus comprising an inert gas circuit including an absorber conduit and an evaporator conduit, means for supplying refrigerant liquid to said evaporator conduit, means for supplying lean absorbing solution to said absorber conduit, power driven means for circulating the inert gas through said conduits with sufficient force to circulate the refrigerant and the absorbing solution through said evaporator and absorber conduits respectively by the sweeping and dragging action of the inert gas flowing thereby, said circuit being arranged in such fashion that the lean inert gas discharged from the absorbing conduit meets the refrigerant in the evaporating conduit to circulate the same therethrough whereby the concentration of refrigerant vapor in the inert gas progressively increases as the refrigerant is circulated through said evaporating conduit and evaporation occurs at progressively increasing temperature levels.

23. Absorption refrigerating apparatus comprising an inert gas circuit including an absorber vessel and an evaporator vessel, means for supplying refrigerant liquid to said evaporator vessel, means for supplying lean absorbing solution to said absorber vessel, power driven means for circulating the inert gas through said vessels with sufficient impetus to circulate the refrigerant and the absorbing solution through said evaporator and absorber vessels respectively by the frictional drag of the inert gas flowing thereby, at least one of said vessels being constructed from continuous conduit.

24. Absorption refrigerating apparatus comprising an inert gas circuit including an evaporator and a pair of absorbers, a solution circuit including a boiler and said absorber, means for liquefying refrigerant vapor produced in said boiler and for supplying the liquid to said evaporator, means for circulating the inert gas through one of said absorbers with a velocity sufficient to propel the solution therethrough by the frictional drag of the inert gas flowing thereby, and means for cooling solution in its passage from one of said absorbers to the other.

25. That improvement in the art of absorption refrigerating systems of the type utilizing a refrigerant, an absorbent, and a pressure equalizing medium inert with respect to the refrigerant and absorbent which includes the steps of evaporating refrigerant into the pressure equalizing medium to produce refrigeration, passing the resulting mixture of refrigerant vapor and pressure equalizing medium into contact with absorbing solution, dissipating the heat of absorption to ambient air at a high temperature level, passing the resulting relatively lean mixture of pressure equalizing medium and refrigerant vapor into contact with absorbing solution having a low refrigerant content to further lower the refrigerant vapor content of the mixture, dissipating the resulting heat of absorption to ambient air at a low temperature, and circulating the pressure equalizing medium refrigerant vapor mixture passing in contact with the absorbing solution at one of said temperatures at a velocity sufficient to propel and agitate the absorbing solution as absorption occurs.

26. Absorption refrigerating apparatus comprising an inert gas circuit including an evaporating vessel, a low temperature absorbing vessel and a high temperature absorbing vessel, means for supplying liquid refrigerant to said evaporating vessel, means for supplying absorbing solution to said absorbing vessels, and power driven means for propelling the inert gas through one of said absorbing vessels with sufficient force to sweep or drag the absorbing solution therethrough, the other of said absorbing vessels being connected to receive absorbing solution at its upper portion and having such cross sectional area that the absorbing solution flows therethrough by gravity without aid from the inert gas.

27. Absorption refrigerating apparatus comprising a generator, an evaporator, a condenser and an absorber, means for conveying refrigerant vapor from said generator to said condenser, means for conveying refrigerant liquid from said condenser to said evaporator, power driven means for circulating an inert gas through said evaporator and said absorber, means connecting said generator to said absorber to form a solution circuit, means for conveying inert gas through a part of said last mentioned means with sufficient force to sweep or drag absorption solution therethrough, and means for cooling that portion of the solution circuit through which the inert gas propels the absorption solution.

28. Absorption refrigerating apparatus comprising an inert gas circuit including an evaporating vessel, a low temperature absorbing vessel and a high temperature absorbing vessel, means for supplying liquid refrigerant to said evaporating vessel, means for supplying absorbing solution to said absorbing vessels, and power driven means for propelling the inert gas through one of said absorbing vessels with sufficient force to sweep or drag the absorbing solution therethrough.

29. Refrigerating apparatus including a boiler assembly, a first absorber, a second absorber, means for conducting absorption solution from said boiler assembly to said first absorber, means for circulating a pressure equalizing medium through said absorbers, said first absorber being so constructed and arranged that the pressure equalizing medium passes into and out of the solution therein, means for conducting solution from said first absorber to said second absorber, means for conducting solution from said second absorber to said boiler assembly, the construction and arrangement being such that the pressure equalizing medium and the solution flow in opposite directions through said second absorber.

30. Absorption refrigerating apparatus comprising a boiler assembly, an evaporator, a pair of absorbers, means for liquefying refrigerant vapor produced in said boiler and for supplying the liquid to said evaporator, connections providing for circulation of the absorption solution through said boiler assembly and through each of said absorbers serially, and means providing for circulation of inert gas through said evaporator and said absorbers serially, said evaporator being so constructed and arranged that the inert gas circulates the refrigerant liquid therethrough, and said absorbers being so constructed and arranged that the inert gas bubbles into and out of the absorption solution in one of said absorbers and flows in counterflow relationship with the absorption solution in the other of said absorbers.

31. Absorption refrigerating apparatus comprising a boiler assembly, an evaporator, a first absorber and a second absorber, means for liquefying refrigerant vapor produced in said boiler and for supplying the liquid to said evaporator, means for conveying solution from said boiler assembly to said first absorber, means for conveying absorption solution from said first absorber to said second absorber, means for conveying absorption solution from said second absorber to said boiler assembly, and means for circulating a rich mixture of pressure equalizing medium and refrigerant vapor from said evaporator through said second absorber in counterflow relationship to said absorption solution and for then propelling the said mixture to and through said first absorber, said first absorber being so constructed and arranged that said mixture flows therethrough with sufficient pressure and velocity to bubble into and out of absorption solution therein.

32. Absorption refrigerating apparatus comprising a boiler assembly, an evaporator, a first absorber, a second absorber, means for liquefying refrigerant vapor produced in said boiler and for supplying the liquid to said evaporator, means for conveying solution from said boiler assembly to said first absorber, means for conveying absorption solution from said first absorber to said second absorber, means for conveying absorption solution from said second absorber to said boiler assembly, means for flowing a rich mixture of pressure equalizing medium and refrigerant vapor from said evaporator to said first absorber, said first absorber being so constructed and arranged that said mixture flows through said first absorber with sufficient pressure and velocity to bubble into and out of the absorption solution therein, and means for conducting the pressure equalizing medium refrigerant vapor mixture to said second absorber and for flowing the same therethrough in counterflow relationship with the absorption solution.

GEO. A. BRACE.